US008482550B2

(12) United States Patent
Tanikame

(10) Patent No.: US 8,482,550 B2
(45) Date of Patent: Jul. 9, 2013

(54) DISPLAY DEVICE AND OUTPUT BUFFER CIRCUIT FOR DRIVING THE SAME

(75) Inventor: Takao Tanikame, Kanagawa (JP)

(73) Assignee: Sony Corporation, Tokyo (JP)

(*) Notice: Subject to any disclaimer, the term of this patent is extended or adjusted under 35 U.S.C. 154(b) by 664 days.

(21) Appl. No.: 12/382,714

(22) Filed: Mar. 23, 2009

(65) Prior Publication Data

US 2009/0256827 A1 Oct. 15, 2009

(30) Foreign Application Priority Data

Apr. 15, 2008 (JP) ................................ 2008-105581

(51) Int. Cl.
*G06F 3/038* (2006.01)
*G09G 5/00* (2006.01)
*G09G 3/30* (2006.01)

(52) U.S. Cl.
USPC ............................................ 345/204; 345/76

(58) Field of Classification Search
None
See application file for complete search history.

(56) References Cited

U.S. PATENT DOCUMENTS 5,434,479 A * 7/1995 Ohnishi et al. ............ 315/209 R
7,193,370 B2 * 3/2007 Kim .......................... 315/169.1
7,855,520 B2 * 12/2010 Leng ............................ 315/307
7,965,273 B2 * 6/2011 Lee et al. ........................ 345/98
2007/0268210 A1 11/2007 Uchino et al.
2008/0143697 A1 * 6/2008 Kojima ......................... 345/204

FOREIGN PATENT DOCUMENTS

JP 51-117531 A 10/1976
JP 01-137807 A 5/1989
JP 04-290007 A 10/1992
JP 09-130430 A 5/1997
JP 09-245482 A 9/1997
JP 2000-276111 A 10/2000
JP 2001-077684 A 3/2001
JP 2003-241706 A 8/2003
JP 2006-140639 A 6/2006
JP 2006-215098 A 8/2006
JP 2006-318204 A 11/2006
JP 2007-310311 11/2007

* cited by examiner

*Primary Examiner* — Daniell L Negron
(74) *Attorney, Agent, or Firm* — Rader, Fishman & Grauer PLLC

(57) ABSTRACT

Disclosed herein is a display device including: a plurality of pixel circuits; a power source line connected to corresponding ones of the plurality of pixel circuits; and an output buffer circuit for supplying currents to corresponding ones of the plurality of pixel circuits by alternately applying a first potential applied to a first power source supply terminal, and a second potential applied to a second power source supply terminal to the power source line. The output buffer includes a variable resistance circuit connected to a path between the first power source supply terminal and the power source line, the variable resistance circuit serving to change a resistance value thereof in accordance with a magnitude of a total sum of the currents.

4 Claims, 15 Drawing Sheets

DISPLAY DEVICE AND OUTPUT BUFFER CIRCUIT FOR DRIVING THE SAME

BACKGROUND OF THE INVENTION

1. Field of the Invention

The present invention relates to a display device and an output buffer circuit, and more particularly to a display device using light emitting elements in pixels, respectively, and an output buffer circuit for driving the same.

2. Description of the Related Art

In recent years, a planar self-emission type display device using organic Electroluminescence (EL) elements as light emitting elements has been actively developed. Since the organic EL element emits a light when an electric field is applied across an organic thin film, and has superior visibility although it is driven with a low voltage, the organic EL element is expected as contributing to the weight-lightening, the film thinning, and the low power consumption of the display device.

In the display device using the organic EL elements, an electric field which is applied across the organic thin film is controlled by a drive transistor composing a pixel circuit. However, a threshold voltage and a mobility which the drive transistor has disperse every drive transistor. For this reason, it is necessary to execute processing for correcting differences in threshold voltage and mobility between each two drive transistors. Heretofore, the pixel circuit adapted to execute such correction processing is unsuitable for the high definition promotion in the display device due to complication of a manufacture process, and reduction of an aperture ratio because a large number of constituent elements are required. On the other hand, there is proposed a display device in which a signal intended to be supplied to a pixel circuit is switched, thereby simplifying a configuration of the pixel circuit. This display device, for example, is disclosed in Japanese Patent Laid-Open No. 2007-310311 (refer to FIG. 3A). Specifically, in a state in which a potential at a High (H) level is applied from a power source line to a drive transistor, a reference signal is supplied from a data line to a pixel circuit, thereby carrying out threshold voltage correction. After that, a data signal on the data line is switched from the reference signal over to a video signal, and the video signal is supplied to the pixel circuit, thereby carrying out mobility correction. In addition thereto, after a light emitting element is caused to emit a light, the potential of the power source line is switched from the H level over to a Low (L) level, thereby initializing the drive transistor. In such a manner, one signal is switched over to another different one for the data line and the power source line, and another different signal is supplied to the drive signal, thereby making it possible to simplify the configuration of the pixel circuit.

SUMMARY OF THE INVENTION

With the related art described above, the signals supplied from the data line and the power source line to the pixel circuits are pulsed, thereby making it possible to simplify the configuration of the pixel circuit. However, in the pulsing of the signal from the power source line, an output buffer is provided for the purpose of shaping a desired pulse waveform, which results in that voltage drop owing to an electrical resistance of a transistor composing the output buffer is caused, and appears in the form of cross talk in some cases. Here, the cross talk appearing owing to the voltage drop in the transistor composing the output buffer will be described in brief hereinafter with reference to FIGS. 13A and 13B, FIG. 14, and FIGS. 15A and 15B. It is noted that "the cross talk" stated herein means that luminance difference occurs between each two pixel circuits adjacent to each other in units of rows.

FIGS. 13A and 13B are conceptual circuit diagrams each exemplifying a flow of a drive current supplied from an output buffer for an emission time period. In this case, there is shown an example in which a drive current Ids is supplied from an output buffer 800 to n pixel circuits 811 to 814 through a power source line 810. The output buffer 800 is a Complementary Metal Oxide Semiconductor (CMOS) inverter composed of a p-channel transistor 803 and an n-channel transistor 804. A fixed power source line 801 is connected to a source terminal of the p-channel transistor 803, and a fixed power source line 802 is connected to a source terminal of the n-channel transistor 804. A potential Vcc_H at an H level, and a potential Vcc_L at an L level are fixedly applied to the fixed power source lines 801 and 802, respectively.

In FIG. 13A, it is supposed that each of the n pixel circuits 811 to 814 connected to the power source line 810 displays a white color. In this case, the drive current (Ids×n) obtained by multiplying the drive current Ids supplied from the fixed power source line 801 to each of the pixel circuits 811 to 814 by "n" is caused to flow through the p-channel transistor 803. In addition, the p-channel transistor 803 is held in an ON (conduction) state, and voltage drop is caused by an electrical resistance Ron which the p-channel transistor 803 has in the ON state. Since the electrical resistance Ron is sufficiently higher than that of a metallic wiring, a change in the drive current Ids remarkably appears in the form of a change in voltage drop. Here, an output potential Va at a connection node between the output buffer 800 and the power source line 810 can be expressed by Expression (1):

$$Va = Vcc\_H - (Ids \times n) \times Ron \quad (1)$$

On the other hand, in FIG. 13B, it is supposed that only the first pixel circuit 811 displays the white color, and each of the remaining pixel circuits 812 to 814 displays a black color. For this reason, only the drive current (Ids×1) corresponding to the drive current Ids supplied from the fixed power source line 801 to the first pixel circuit 811 is caused to flow through the p-channel transistor 803. Here, an output potential Vb of the output buffer 800 can be expressed by Expression (2):

$$Vb = Vcc\_H - (Ids \times 1) \times Ron \quad (2)$$

From the above description, it is understood that the output potential at the connection node between the output buffer 800 and the power source line 810 changes in accordance with the light emission states of the n pixel circuits 811 to 814. Ideally, when a gate-to-source voltage Vgs of the drive transistor is determined by operating the drive transistor provided within the pixel circuit within a saturated region, the drive current is uniquely determined. Actually, however, even when the drive transistor within the pixel circuit is operated within the saturated region due to the Early effect, the drive current Ids also changes so as to follow the change in drain-to-source voltage Vds of the drive transistor.

FIG. 14 is a graph schematically showing an example of a relationship between a drain potential Vd and the drive current Ids of the drive transistor in the pixel circuit. In this case, the graph shows Vd–Ids characteristics of the drive transistor. In the graph, an axis of abscissa represents the drain potential Vd of the drive transistor, and an axis of ordinate represents the drive current Ids. In addition, the drain potential Vd of the drive transistor is a potential applied thereto from the power source line 810, and is also an output potential from the output buffer 800. It is understood from the graph that since Vd–Ids characteristics 820 of the drive transistor have a gradient within a saturated region, the drive current Ids changes in accordance with the drain potential Vd. For example, even when the same signal potential is written to the pixel circuit for a write time period of the pixel circuit, a difference ΔIds occurs in the drive current Ids due to a difference (Vb−Va) between the output potential Va from the output buffer 800 shown in FIG. 13A, and the output potential Vb from the output buffer 800 shown in FIG. 13B. As a result, the luminance of the light emitting element changes accordingly. As described above, the output potential from the output buffer 800 changes in accordance with the light emission state of the pixel circuit in each of the rows, and the drive current changes so as to follow this change in output potential from the output buffer 800. As a result, the luminances of the light emitting elements change in units of the rows.

FIGS. 15A and 15B are conceptual diagrams exemplifying an influence of the cross talk appearing owing to the voltage drop in the output buffer 800. FIG. 15A shows an image displayed in a display device. In this case, it is supposed that the display device displays thereon an image in which a black window is shown against a white background. It is noted that for the sake of convenience of a description, this image is partitioned into three parts in a row direction. In this case, the three parts correspond to a white display area 831, a black window display area 832, and a white display area 833 from the upper side in each of FIGS. 15A and 15B, respectively. An area composed of lines in which a black color is contained in one row is the black window display area 832, and white areas other than the black window display area 832 are the window display areas 831 and 833, respectively. FIG. 15B is a conceptual diagram when the image shown in FIG. 15A is displayed on the display device. In this case, in each of the white display areas 831 and 833, as has been described, the current caused to flow from the fixed power source line 801 into the output buffer increases, and the voltage drop in the output buffer increases so as to follow the increase in current, thereby reducing the output potential from the output buffer. As a result, since the luminances of the light emitting elements are reduced in units of the rows, the image is displayed with a gray color on a display screen. On the other hand, each of left-hand and right-hand side areas of the black window within the black window display area 832 is displayed with a color which is close to the white color all the more because the voltage drop is smaller than that in each of the white display areas 831 and 833.

In the manner as described above, the provision of the output buffer for shaping the pulse waveform of the power source signal in the power source line results in that the difference occurs between each two output potentials in the rows due to the difference between each two drive currents caused to flow through the output buffers corresponding to the rows, respectively. As a result, the luminance difference occurs between the light emitting element in the row concerned and the light emitting element in row adjacent thereto, so that the cross talk appears in some cases.

The present invention has been made in the light of such circumstances, and it is therefore desirable to provide a display device in which a change in voltage drop caused in an output buffer is suppressed, thereby reducing cross talk.

In order to attain the desire described above, according to an embodiment of the present invention, there is provided a display device including: a plurality of pixel circuits; a power source line connected to corresponding ones of the plurality of pixel circuits; and an output buffer circuit for supplying currents to corresponding ones of the plurality of pixel circuits by alternately applying a first potential applied to a first power source supply terminal, and a second potential applied to a second power source supply terminal to the power source line. The output buffer includes a variable resistance circuit connected to a path between the first power source supply terminal and the power source line, the variable resistance circuit serving to change a resistance value thereof in accordance with a magnitude of a total sum of the currents.

In the embodiment of the present invention, there is suppressed a change in voltage drop caused between the first power source supply terminal and the power source line by the currents supplied to corresponding ones of the plurality of pixel circuits.

In addition, preferably, the variable resistance circuit is composed of a field effect transistor. As a result, the resistance value is changed in accordance with the magnitude of the total sum of the currents supplied to the corresponding ones of the plurality of pixel circuits.

In addition, preferably, each of the plurality of pixel circuits includes a light emitting element which emits a light in accordance with the current supplied thereto from the power source line. As a result, the light emitting element is caused to emit a light in accordance with the drive current supplied from the power source line. In this case, preferably, the display device further includes: a data line connected to corresponding ones of the plurality of pixel circuits; a scanning line connected to the corresponding ones of the plurality of pixel circuits; a data driving circuit for alternately supplying a video signal and a reference signal as a data signal to the date line; and a scanning driving circuit for supplying a control signal to the scanning line. Each of the plurality of pixel circuits further includes first and second transistors, and a hold capacitor. The first transistor causes the hold capacitor to hold therein a potential of the data signal from the first or second data line in accordance with the control signal from the scanning line. When the first or second potential applied from the power source line is supplied thereto, the second transistor supplies a drive current to the light emitting element in accordance with the potential of the data signal held in the hold capacitor. The light emitting element emits a light in accordance with the drive current. As a result, the first transistor causes the hold capacitor to hold therein the potential of the data signal in accordance with the control signal supplied from the scanning line. Also, when the potential of the power source signal from the power source line is applied thereto, the second transistor supplies the drive current to the light emitting element in accordance with the signal potential held in the hold capacitor, thereby causing the light emitting element to emit a light.

According to another embodiment of the present invention, there is provided an output buffer circuit including: a first transistor having a source terminal to which a first power source supply terminal is connected, and a gate terminal to which an input signal line is connected; a second transistor having a source terminal to which a second power source supply terminal is connected, and a gate terminal to which the input signal line is connected; and a variable resistance circuit connected to a path between a drain terminal of the first transistor, and a drain terminal of the second transistor, and connected to an output signal line. The variable resistance circuit changes a resistance value thereof in accordance with a magnitude of a current supplied thereto from the first power source supply terminal.

In the another embodiment of the present invention, the change in potential of the output signal line is suppressed.

According to embodiments of the present invention, it is possible to offer a superior effect that the change in voltage drop caused in the output buffer is suppressed, thereby reducing the cross talk.

DETAILED DESCRIPTION OF THE PREFERRED EMBODIMENTS

The preferred embodiments of the present invention will be described in detail hereinafter with reference to the accompanying drawings.

Figure 1:
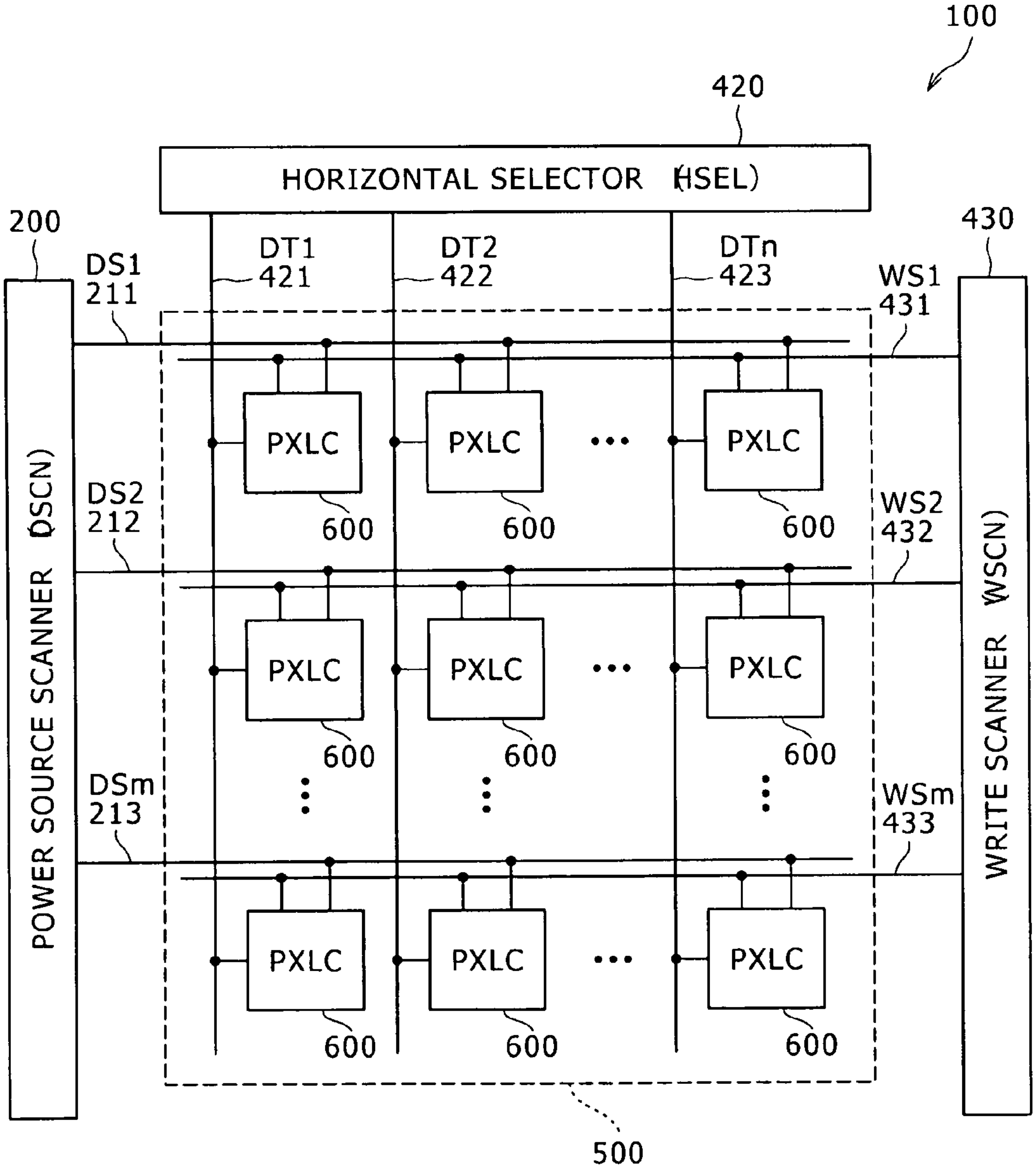
FIG. 1 is a block diagram showing a configuration of a part of a display device according to an embodiment of the present invention.

FIG. 1 is a block diagram showing a configuration of a part of a display device 100 according to an embodiment of the present invention.

The display device 100 includes a pixel array portion 500 in which pixel circuits 600 are disposed in a two-dimensional matrix of m×n, and power source lines 211 to 213 and scanning lines 431 to 433 which are wired so as to correspond to rows of the pixel circuits 600, respectively. Also, the display device 100 includes a power source scanner DSCN 210, a write scanner WSCN 430, data lines 421 to 423 wired so as to correspond to columns of the pixel circuits 600, and a horizontal selector HSEL 420. In addition, the power source lines 211 to 213, the data lines 421 to 423, and the scanning lines 431 to 433 are connected to the pixel circuits 600, respectively.

The power source scanner 200 switches a potential Vcc_H at an H level and a potential Vcc_L at an L level which are supplied from the power source line over to each other, and outputs the potential obtained through the switching as a power source signal to each of the power source lines 211 and 213. Moreover, the power source scanner 200 carries out the adjustment so that the potential Vcc_H at the H level outputted to each of the power source lines 211 to 213 becomes constant.

The horizontal selector 420 switches a video signal and a reference signal over to each other, and supplies the signal obtained through the switching as a data signal to each of the data lines 421 to 423. In addition, the horizontal selector 420 is an example of a data driving circuit described in the appended claims.

The write scanner 430 controls timings at which the data signals on the data lines 421 to 423 are written to the pixel circuits 600, respectively, in units of rows. In addition, the write scanner 430 is an example of a scanning driving circuit described in the appended claims.

Figure 2:
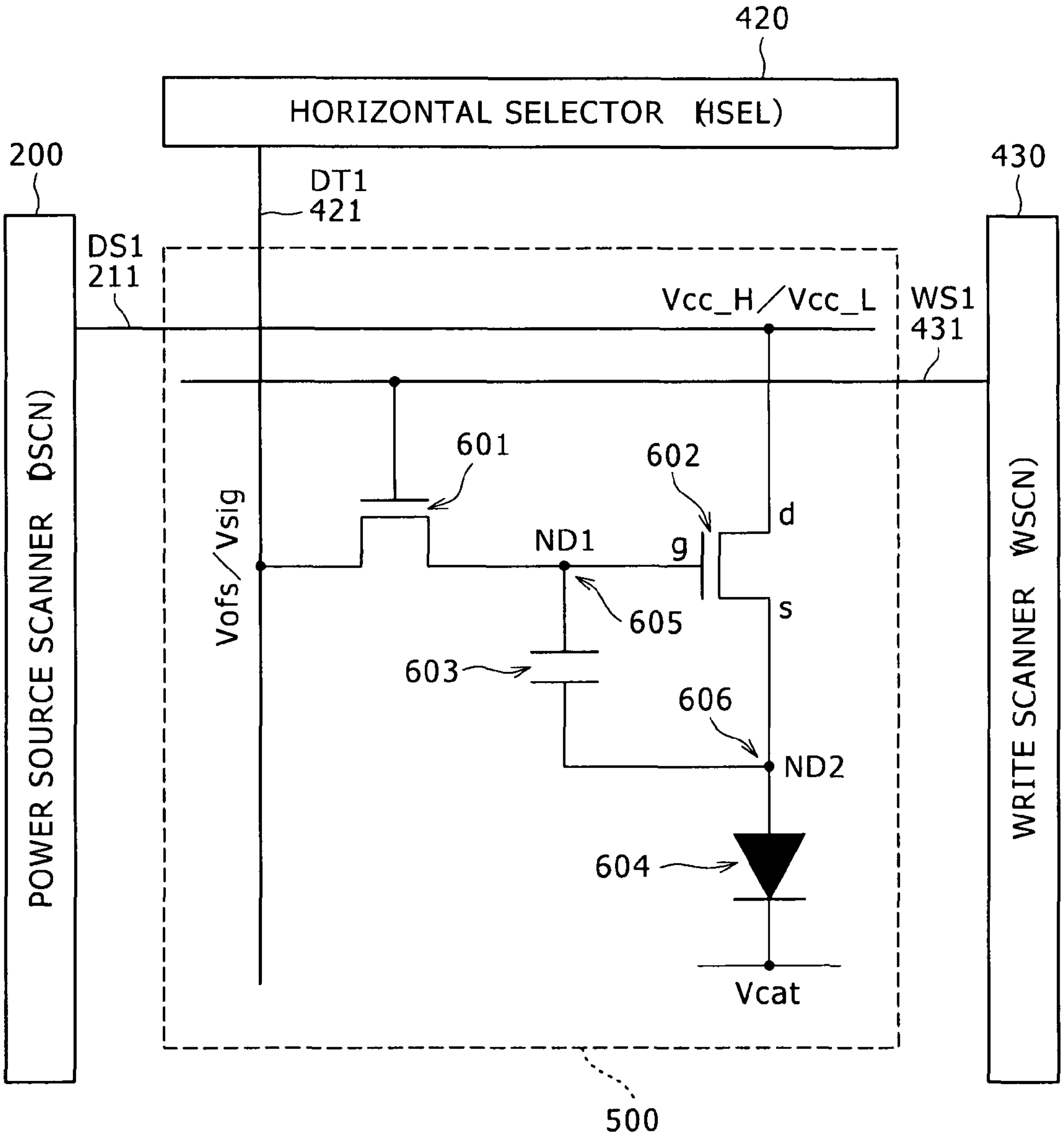
FIG. 2 is a schematic circuit diagram, partly in block, showing a configuration of a general pixel circuit.

FIG. 2 is a schematic circuit diagram showing a configuration of a general pixel circuit. The pixel circuit 600 includes a write transistor 601, a drive transistor 602, a hold capacitor 603, and a light emitting element 604 composed of an organic EL element. A scanning line WS1 431 and a data line DT1 421 are connected to a gate terminal and a drain terminal of the write transistor 601, respectively. In addition, one electrode of the hold capacitor 603, and a gate terminal g of the drive transistor 602 are each connected to a source of the write transistor 601. This connection portion is called a first node ND1 605 herein. A power source line 211 is connected to a drain terminal d of the drive transistor 602, and the other electrode of the hold capacitor 603, and an anode electrode of the light emitting element 604 are each connected to a source terminal s of the drive transistor 602. This connection portion is called a second node ND2 606 herein.

The write transistor 601 causes the hold capacitor 603 to hold therein either a potential Vofs of the reference signal, or a potential Vsig of the video signal as the data signal from the data line DT1 421 in accordance with a control signal supplied from the scanning line WS1 431. In addition, the write transistor 601 is an example of a first transistor described in the appended claims.

The drive transistor 602 receives the potential Vcc_H at the H level from the power source line DS1 211, and causes a drive current to flow through the light emitting element 604 in accordance with the signal potential held in the hold capacitor 603. In addition, the drive transistor 602 is an example of a second transistor described in the appended claims.

The light emitting element 604 includes the anode electrode and a cathode electrode, and also includes an organic thin film between the anode electrode and the cathode electrode.

Figure 3:
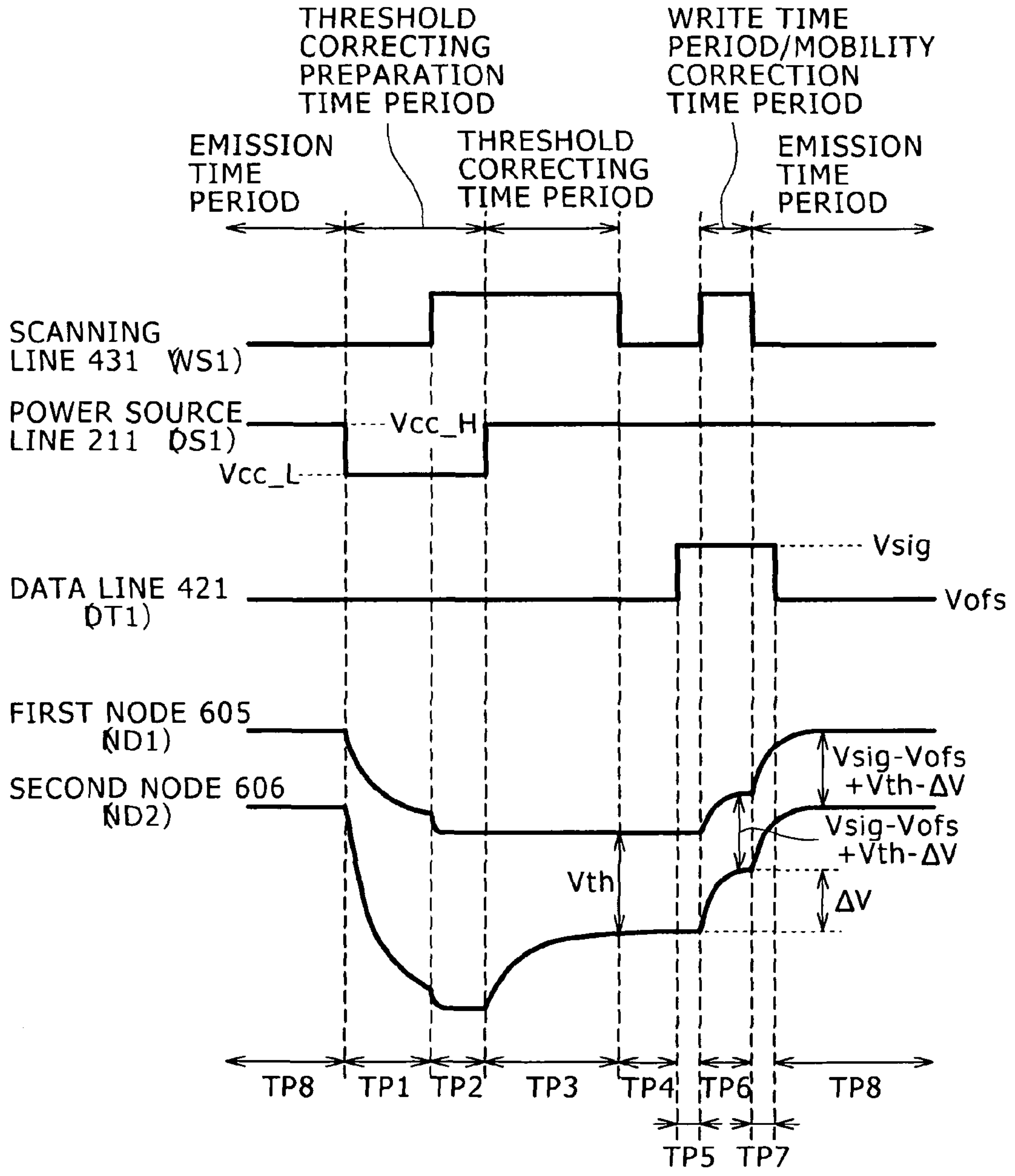
FIG. 3 is a timing chart explaining an operation of a pixel circuit shown in the display device shown in FIG. 1.

FIG. 3 is a timing chart explaining an operation of the pixel circuit 600 shown in FIG. 1. In this case, an axis of abscissa is used as a common time axis, and changes in potentials of the scanning line 431, the power, source line 211, the data line 421, the first node 605, and the second node 606 are represented in FIG. 3. It is noted that lengths of the axes of abscissa representing respective time periods are merely schematic, and do not represent rates of time lengths of the respective time periods.

In this timing chart, a time period for transition of the operation of the pixel circuit 600 is partitioned into time periods TP1 to TP8 for descriptive purposes. For the emission time period TP8, the light emitting element 604 is in an emission state. In this state, the potential of the control signal for the scanning line 431 is set at the L level, the potential of the power source signal of the power source line 211 is set at the potential Vcc_H at the H level, and the potential of the data line 421 is set at the potential Vofs of the reference signal. After that, the operation enters a new field based on line-sequential scanning. For the threshold correction preparing time period TP1, the potential of the power source line 211 is caused to drop to the potential Vcc_L at the L level. As a result, each of the potentials at the first node 605 and the second node 606 drops. Subsequently, for a threshold correction preparing time period TP2, the potential of the scanning line 431 is caused to rose to the H level, thereby initializing the first node 605 at the potential Vofs of the reference signal. The second node 606 is also initialized so as to follow the initializing operation. The first node 605 and the second node 606 are initialized in such a manner, thereby completing the preparation for the threshold correcting operation.

Next, for a threshold correction time period TP3, a threshold voltage correcting operation is carried out. The potential of the power source line 211 is set at the potential Vcc_H at the H level, and a voltage corresponding to the threshold voltage Vth is held between the first node 605 and the second node 606. Actually, a voltage corresponding to the threshold voltage Vth is written to the hold capacitor 603. After that, for a time period TP4, the potential of the control signal supplied to the scanning line 431 is caused to drop to the potential at the L level once. For a time period TP5, the potential of the data signal on the data line 421 is switched from the potential Vofs of the reference signal over to the potential Vsig of the video signal.

Next, for a write time period/mobility correction time period TP6, the potential at the first node 605 rises up to the potential Vsig of the video signal, and the potential at the second node 606 rises by a voltage ΔV for mobility correction. That is to say, a voltage obtained by subtracting the voltage ΔV from a signal voltage (Vsig−Vofs) as a difference in potential between the video signal Vsig and the reference signal Vofs is held in the hold capacitor 603. After that, for emission time periods TP7 and TP8, the light emitting element 604 emits a light with a luminance corresponding to the signal potential. In this case, the luminance of the light emitting element 604 is free from an influence of dispersion of the threshold voltages Vth and the mobilities of the drive transistors 602 because the signal voltage is adjusted based on the threshold voltage Vth and the voltage ΔV for mobility correction. It is noted that for a time period from the emission time period TP7 to the middle of the emission time period TP8, each of the potentials at the first and second nodes 605 and 606 rises while a difference (Vsig−Vofs+Vth−ΔV) in potential between the first node 605 and the second node 606 is maintained by carrying out a bootstrap operation.

Next, the transition of the operation of the pixel circuit 600 described above will be described in detail with reference to FIGS. 4A to 4C, FIGS. 5A to 5C, and FIGS. 6A and 6B. In this case, there are shown the operation states of the pixel circuit 600 corresponding to the time periods TP1 to TP8, respectively, in the timing chart shown in FIG. 3. It is noted that for descriptive purposes, a parasitic capacitance 608 of the light emitting element 604 is illustrated in those figures. In addition, the write transistor 601 is illustrated in the form of a switch, and the scanning line 431 is omitted in illustration thereof for the sake of simplicity.

Figure 4A:
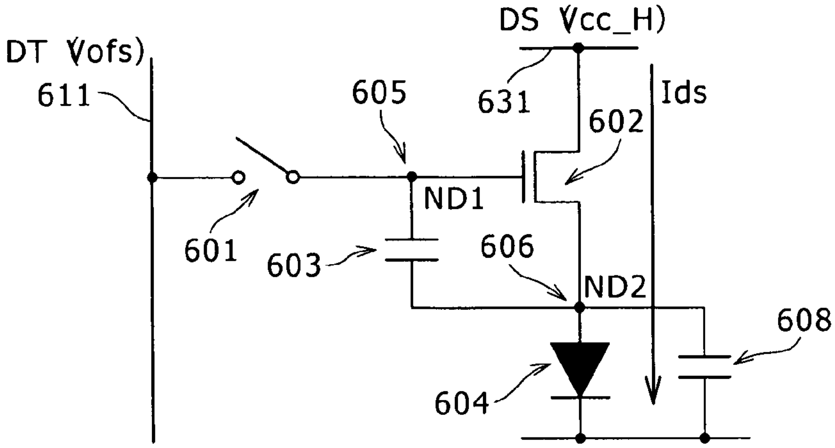
FIGS. 4A, 4B and 4C are schematic circuit diagrams showing operation states of the pixel circuit shown in FIG. 3 corresponding to respective time periods shown in FIG. 1.
Figure 4B:
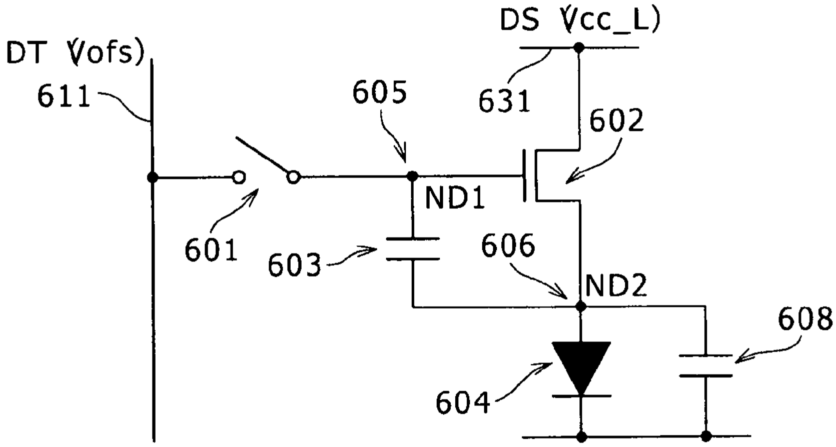
Figure 4C:
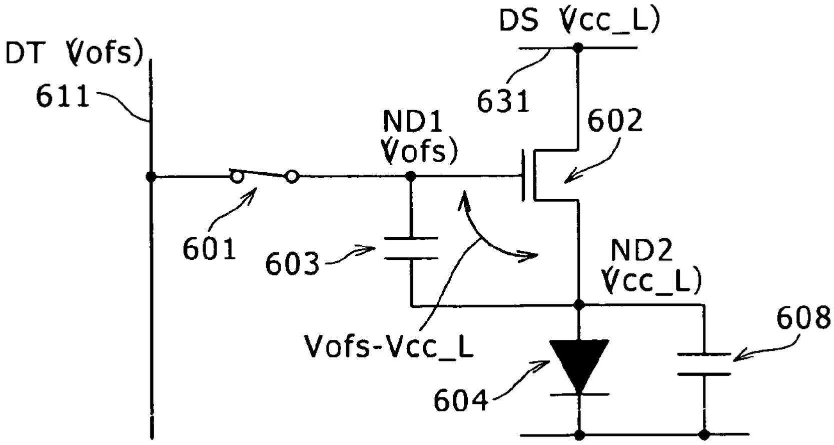

FIGS. 4A to 4C are schematic diagrams showing the operation states of the pixel circuit 600 corresponding to the time periods TP8, TP1 and TP2, respectively. For the emission time period TP8, as shown in FIG. 4A, the potential of the power source line DS1 211 is held at the potential Vcc_H at the H level, and thus the drive transistor 602 supplies the drive current Ids to the light emitting element 604.

Next, for the threshold correction preparing time period TP1, as shown in FIG. 4B, the potential of the power source line 211 transits from the potential at Vcc_H at the H level to the potential Vcc_L at the L level. As a result, the potential at the second node ND2 606 drops, and thus the light emitting element 604 is held in a non-emission state. In addition, the potential at the first node ND1 605 held in a floating state is caused to drop so as to follow the drop of the potential at the second node 606.

Subsequently, for the threshold correction preparing time period TP2, as shown in FIG. 4C, the potential of the scanning line 431 transits from the potential Vcc_L at the L level to the potential Vcc_H at the H level, so that the write transistor 601 is held in an ON (conduction) state. As a result, the potential at the first node 605 is initialized at the potential Vofs of the reference signal on the data line DT1 421. On the other hand, the potential at the second node 606 is initialized at the potential Vcc_L at the L level of the power source line 211 because the potential Vcc_L at the L level of the power source line 211 is sufficiently lower than Vofs of the reference signal. In this case, the potential Vcc_L at the L level of the power source line 211 is set so that a difference (Vofs−Vcc_L) in potential between the first node 605 and the second node 606 becomes larger than the threshold voltage Vth of the drive transistor 602.

Figure 5A:
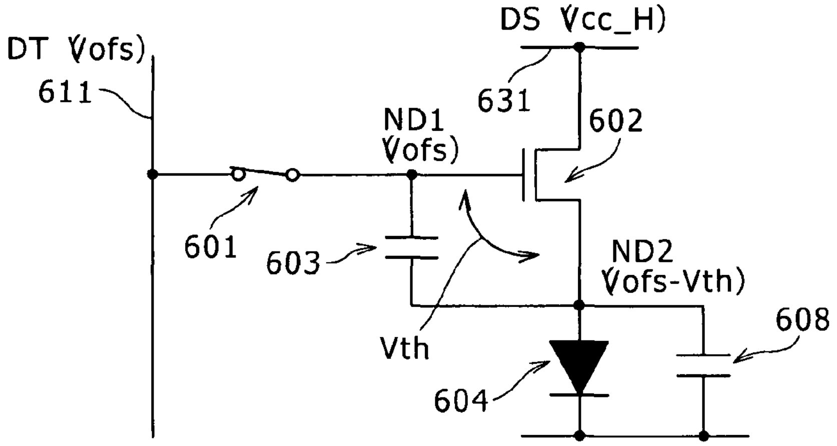
FIGS. 5A, 5B and 5C are schematic circuit diagrams showing operation states of the pixel circuit shown in FIG. 3 corresponding to respective time periods shown in FIG. 1.
Figure 5B:
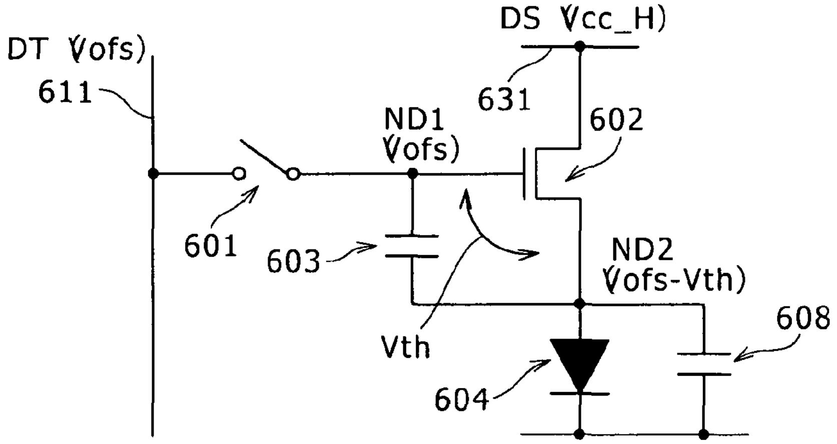
Figure 5C:
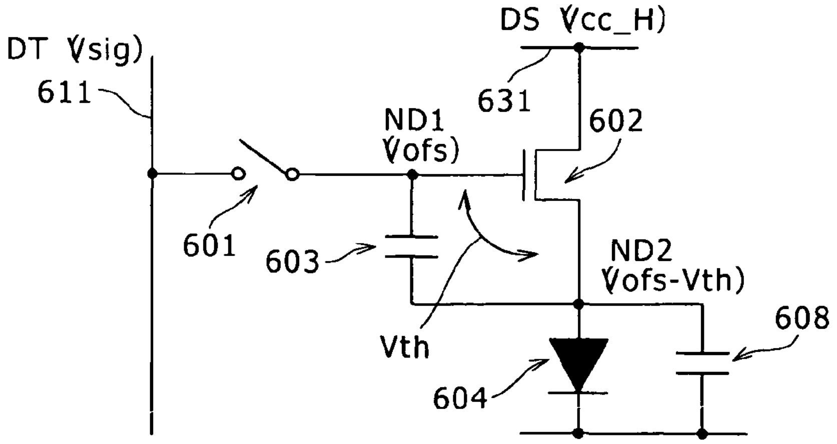

FIGS. 5A to 5C are schematic circuit diagrams showing the operation states of the pixel circuit 600 corresponding to the time periods TP3 to TP5, respectively.

For the threshold correction time period TP3 following the threshold correction preparing time period TP2, as shown in FIG. 5A, the potential of the power source line DS1 211 transits from the potential Vcc_L at the L level to the potential Vcc_H at the H level. As a result, the current is caused to flow through the drive transistor 602, so that the potential at the second node ND2 rises. Also, at a time point when the difference in potential between the first node 605 and the second node 606 becomes equal to the threshold voltage Vth of the drive transistor 602, the current flowing through the drive transistor 602 is stopped (the drive transistor 602 is held in a cut-off state). The voltage corresponding to the threshold voltage Vth of the drive transistor 602 is written to the hold capacitor 603 in the manner as described above. That is to say, this operation is the threshold voltage correcting operation. At this time, a potential Vcat at the cathode electrode of the light emitting element 604 is set so as not to cause the current from the drive transistor 602 to flow through the light emitting element 604. As a result, the current from the drive transistor 602 is caused to flow through the hold capacitor 603.

Next, for the time period TP4, as shown in FIG. 5B, the potential of the control signal supplied from the scanning line 431 transits from the potential Vcc_H at the H level to the potential Vcc_L at the L level, so that the write transistor 601 is held in an OFF (non-conduction) state. Subsequently, for the time period TP5, as shown in FIG. 5C, the potential of the data signal DT1 421 transits from the potential of the reference signal to the potential Vsig of the video signal. In this case, in the data line 421, the write transistors within a plurality of pixel circuits 600 each connected to the data line 421 come to have diffusion capacitances, respectively, so that the potential Vsig of the video signal slowly rises. In this case, the write transistor 601 is held in the OFF state for a time period until the potential of the data signal reaches the potential Vsig of the video signal in consideration of the transient characteristics of the data line 421.

Figure 6A:
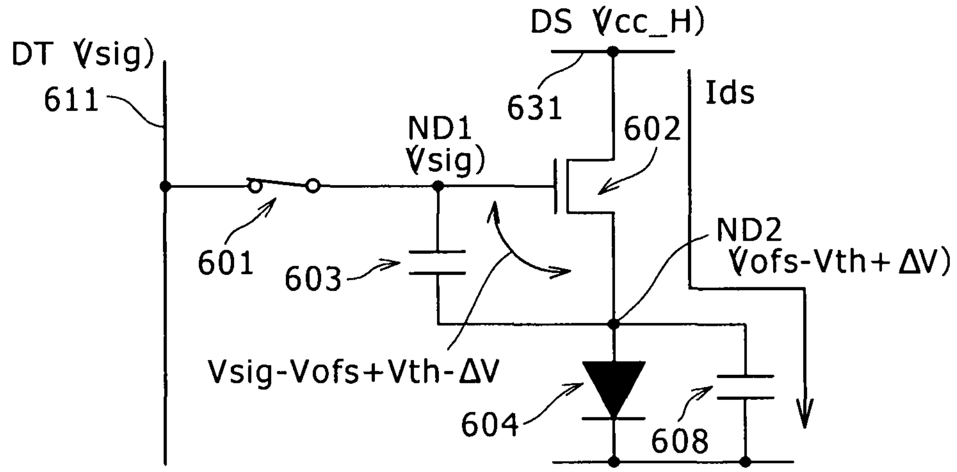
FIGS. 6A and 6B are schematic circuit diagrams showing operation states of the pixel circuit shown in FIG. 3 corresponding to respective time periods shown in FIG. 1.
Figure 6B:
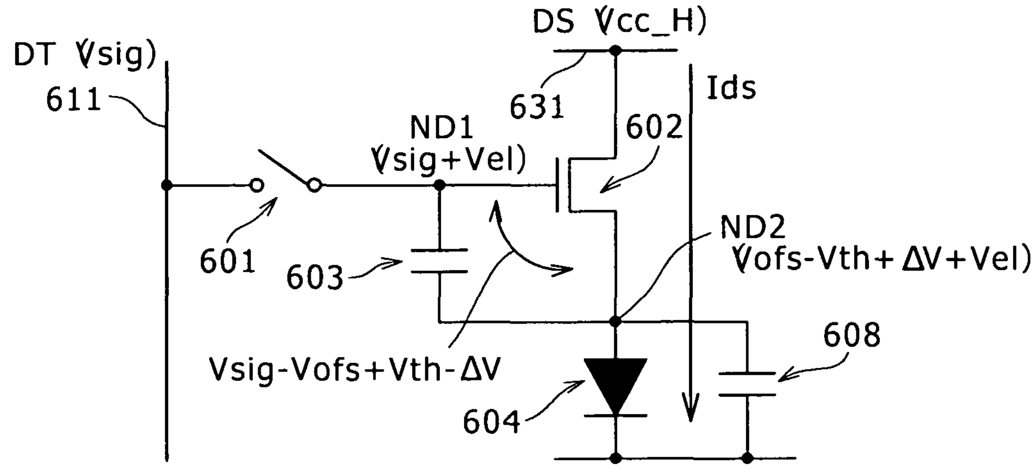

FIGS. 6A and 6B are schematic circuit diagrams showing the operation states of the pixel circuit 600 corresponding to the time periods TP6 and TP7, respectively.

For the write time period/mobility correction time period TP6 following the time period TP5, as shown in FIG. 6A, the write transistor 601 is held in the ON state, and thus the potential at the first node ND1 becomes equal to the potential Vsig of the video signal. As a result, the drive current Ids is caused to flow from the drive transistor 602 into the parasitic capacitance 608 of the light emitting element 604, thereby starting to charge the parasitic capacitance 608 with the electricity. For this reason, the potential at the second node ND2 606 rises. Also, the difference in potential between the first node 605 and the second node 606 becomes (Vsig−Vofs+Vth−ΔV). The writing of the signal potential (Vsig−Vofs), and the adjustment for an amount, ΔV, of mobility correction are carried out in such a manner. Here, the drive current Ids becomes large and the amount, ΔV, of mobility correction also becomes large as the signal potential (Vsig−Vofs) is larger. Therefore, it is possible to carry out the mobility correction corresponding to the luminance level. In addition, when the signal potential (Vsig−Vofs) is held constant, the amount, ΔV, of mobility correction becomes large as the mobility of the drive transistor 602 is larger. That is to say, when the mobility of the drive transistor 602 is large, a gate-to-source voltage of the drive transistor 602 becomes low all the more. Thus, the drive transistor 602 operates so that the drive current does not become large. The dispersion of the mobilities of the drive transistors 602 in the pixel circuits is removed in the manner as described above.

Next, for the emission time period TP7, as shown in FIG. 6B, the write transistor 601 is held in the OFF state. Also, for the emission time period TP8, the data signal on the data line 421 is switched over to the reference signal. As a result, when the potential at the anode electrode of the light emitting element 604 rises in accordance with the drive current Ids of the drive transistor 602, the potential at the first node ND1 605 also rises in conjunction with the rising of the potential at the anode electrode of the light emitting element 604. However, the difference (Vsig−Vofs+Vth−ΔV) in potential between the first node 605 and the second node 606 is maintained as it is based on the bootstrap operation. It is noted that the emission time period TP7 is a time period which is provided in order to prevent the data signal on the data line 421 from being switched over to the reference signal before the write transistor 601 is turned OFF.

Figure 7:
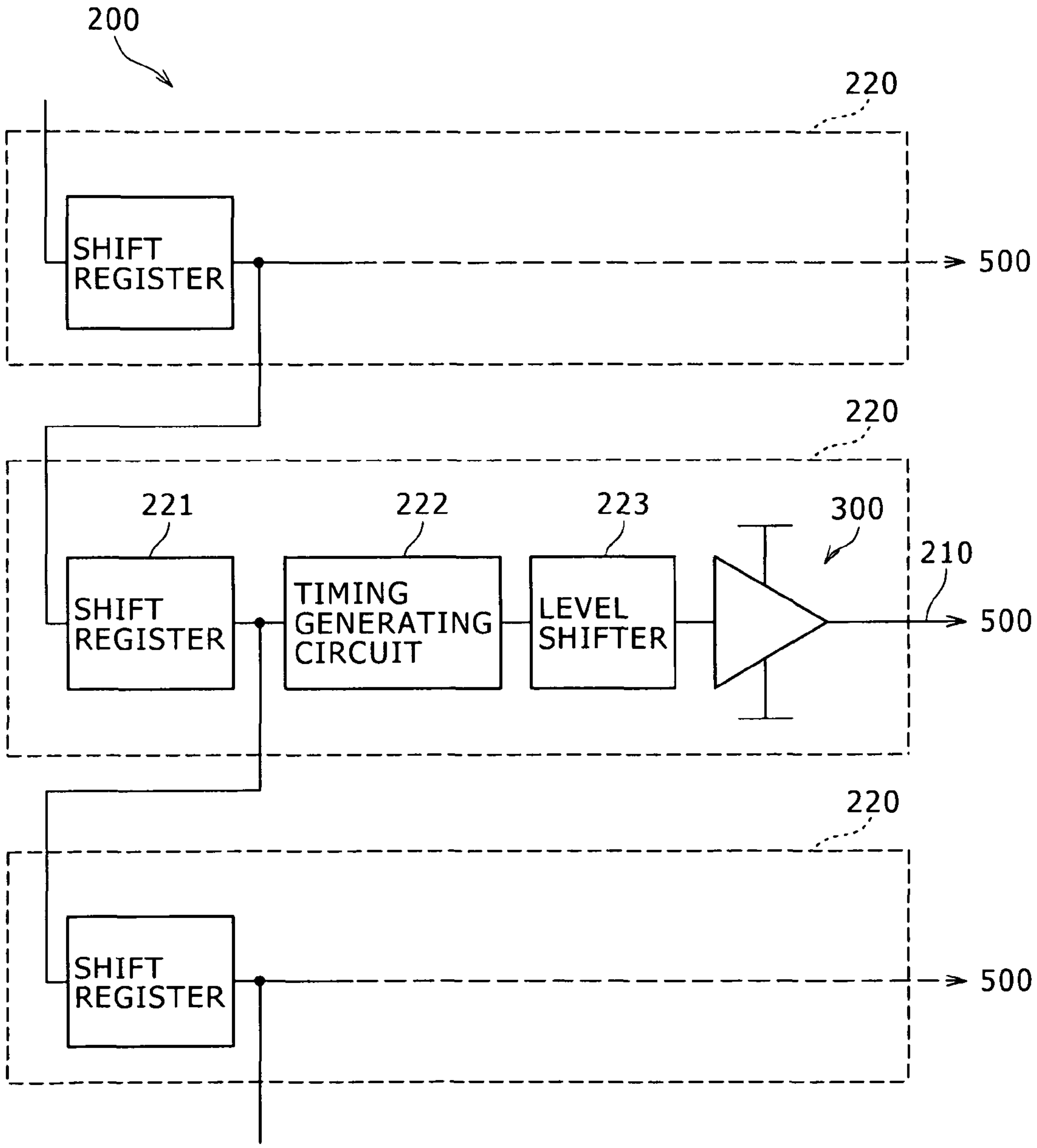
FIG. 7 is a block diagram showing a configuration of a power source scanner.

FIG. 7 is a block diagram showing an example of a configuration of the power source scanner DSCN 200 shown in FIG. 1. The power source scanner DSCN 200 includes power source supplying circuits 220 for the respective rows of the pixel circuits 600, and successively supplies a power source signal to power source lines DS 210 wired in the rows, respectively. The power source supplying circuit 220 generates a switching timing for the power source potential based on a horizontal synchronous signal representing a timing at which the scanning in the row direction is started, thereby switching the potential Vcc_H at the H level and the potential Vcc_L at the L level over to each other. As a result, the power source supplying circuit 220 supplies the potential either at the H level or at the L level to the power source line 210 connected to the power source supplying circuit 220.

The power source supplying circuit 220 includes a shift register 221, a timing generating circuit 222, a level shifter 223, and an output buffer 300.

The shift register 221 successively shifts trigger signals generated in accordance with the horizontal synchronous signal. Specifically, the shift register 221 outputs the trigger signal to the timing generating circuit 222 every row.

The timing generating circuit 222 generates the timing in accordance with the trigger signal outputted from the shift register 221. Specifically, the timing generating circuit 222 generates a pulse having a waveform representing a timing of start of the threshold correction preparing time period TP1 shown in FIG. 3, and a pulse having a waveform representing a timing of end of the threshold correction preparing time period TP2 shown in FIG. 3. The timing generating circuit 222 generates the pulses having the waveforms representing the timings of the threshold correction preparing time periods TP1 and TP2 to the level shifter 223.

The level shifter 223 converts the potential level of the output signal, having the pulse waveform, generated by the timing generating circuit 222 into either the potential Vcc_H at the H level or the potential Vcc_L at the L level. For example, the level shifter 223 carries out the conversion in such a way that at the start of the threshold correction preparing time period TP1, the potential Vcc_L at the L level is outputted from the output buffer 300, and at the end of the threshold correction preparing time period TP2, the potential Vcc_H at the H level is outputted from the output buffer 300.

The output buffer 300 shapes the pulse waveform of the output signal from the level shifter 223, and outputs the resulting signal to the power source line 210. It is noted that the potential of the output signal from the output buffer 300 is applied to the source terminal s of the drive transistor 602 of the pixel circuit 600 connected to the power source line 210. In addition, the output buffer 300 is an example of an output buffer circuit described in the appended claims.

Figure 8:
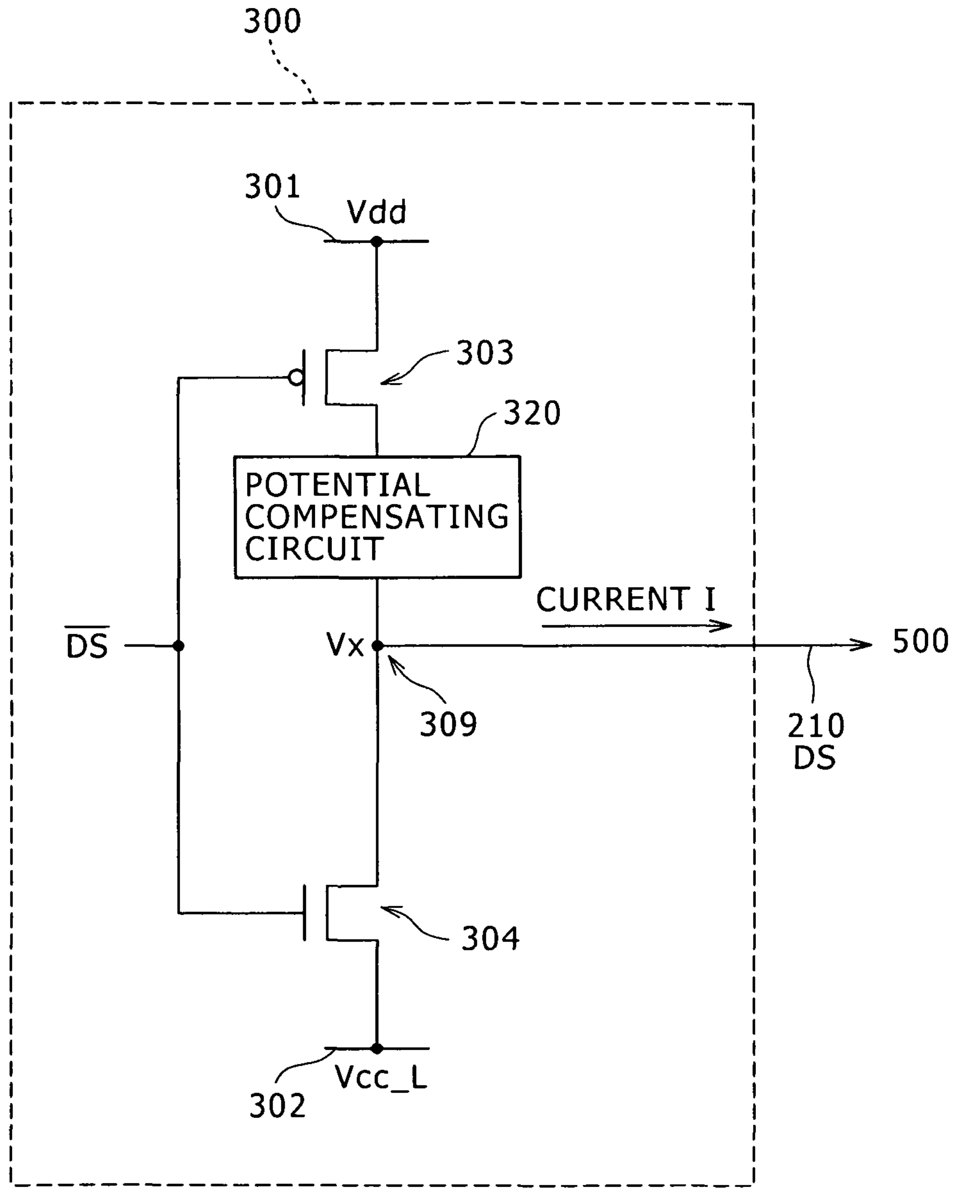
FIG. 8 is a schematic circuit diagram, party in block, showing a configuration of an output buffer according to an embodiment of the present invention.

FIG. 8 is a conceptual circuit diagram showing a configuration of the output buffer 300 according to an embodiment of the present invention. The output buffer 300 is a CMOS inverter configured by connecting a p-channel transistor 303 and an n-channel transistor 304 series with each other. Also, in this embodiment of the present invention, the output buffer 300 includes a potential compensating circuit 320 between the p-channel transistor 303 and the power source line DS 210. It is noted that the potential compensating circuit 320 is an example of a variable resistance circuit described in the appended claims. In addition, in order to reduce a voltage drop caused by an electrical resistance in an ON (conduction) state of the p-channel transistor 303, the n-channel transistor 304 or the like, the p-channel transistor 303 and the n-channel transistor 304 are respectively realized by transistors each having a large size W/L obtained from a ratio of a channel width W to a channel length L of the transistor. Also, the p-channel transistor 303 and the n-channel transistor 304 are examples of first and second transistors described in the appended claims.

An input signal line extending from the level shifter 223 is connected to each of gate terminals of the p-channel transistor 303 and the n-channel transistor 304. Also, a fixed power source line 301 through which a potential Vdd at an H level is fixedly supplied is connected to a source terminal of the p-channel transistor 303, and the potential compensating circuit 320 is connected to a drain terminal of the p-channel transistor 303. On the other hand, a fixed power source line 302 through which a potential Vcc_L at an L level is fixedly supplied is connected to a source terminal of the n-channel transistor 304, and each of a power source line DS 210 and the potential compensating circuit 320 is connected to a drain terminal of the n-channel transistor 304. In this case, this connection node is called an output node 309.

Here, when the output signal from the level shifter 223 is at a potential Vss at an L level, the p-channel transistor 303 is held in an ON (conduction) state, and the n-channel transistor 304 is held in an OFF (non-conduction) state so as to follow the ON state of the p-channel transistor 303. Therefore, a potential Vx at the output node 309 is applied as a potential at an H level to the power source line DS 210. For example, for the emission time period of the light emitting element 604, a drive current I supplied from the fixed power source line 301 to the pixel circuit 600 connected to the power source line DS 210 is caused to flow through the p-channel transistor 303 and the potential compensating circuit 320. Therefore, the voltage drop is caused by the electrical resistances which the p-channel transistor 303 and the potential compensating circuit 320 have, respectively. As a result, the potential Vx at the output node 309 becomes a potential obtained by subtracting the voltage drop from the potential Vdd of the fixed power source line 301.

In this case, the potential compensating circuit 320 controls a resistance value of an electrical resistance of the potential compensating circuit 320 itself in accordance with a total sum I of the drive current caused to flow through the output buffer 300, thereby suppressing a change in potential at the output node 309. For example, when the total sum I of the drive current supplied from the fixed power source line 301 is large, the voltage drop caused by the electrical resistance of the p-channel transistor 303 becomes large accordingly. As a result, since the potential Vx at the output node 309 largely drops, the potential compensating circuit 320 reduces the electrical resistance thereof. On the other hand, when the total sum I of the drive current supplied from the fixed power source line 301 is small, the voltage drop caused by the electrical resistance of the p-channel transistor 303 becomes small accordingly. As a result, since the potential Vx at the output node 309 slightly drops, the potential compensating circuit 320 increases the electrical resistance thereof. As a result, the potential compensating circuit 320 suppresses the change in potential at the output node 309.

As described above, in the embodiment of the present invention, the resistance value of the electrical resistance which the potential compensating circuit 320 has is adjusted in accordance with the total sum I of the drive current caused to flow through the potential compensating circuit 320, thereby suppressing the change in potential at the output node 309. As a result, the cross talk appearing due to the voltage drop caused in the p-channel transistor 303 is reduced. Here, the potential Vdd of the fixed power source line 301 is set so that the potential at the output node 309 becomes the predetermined potential Vcc_H in consideration of the voltage drop caused between the fixed power source line 301 and the output node 309. As a result, the potential Vcc_H as the potential at the H level is supplied to the power source line 210.

Figure 9:
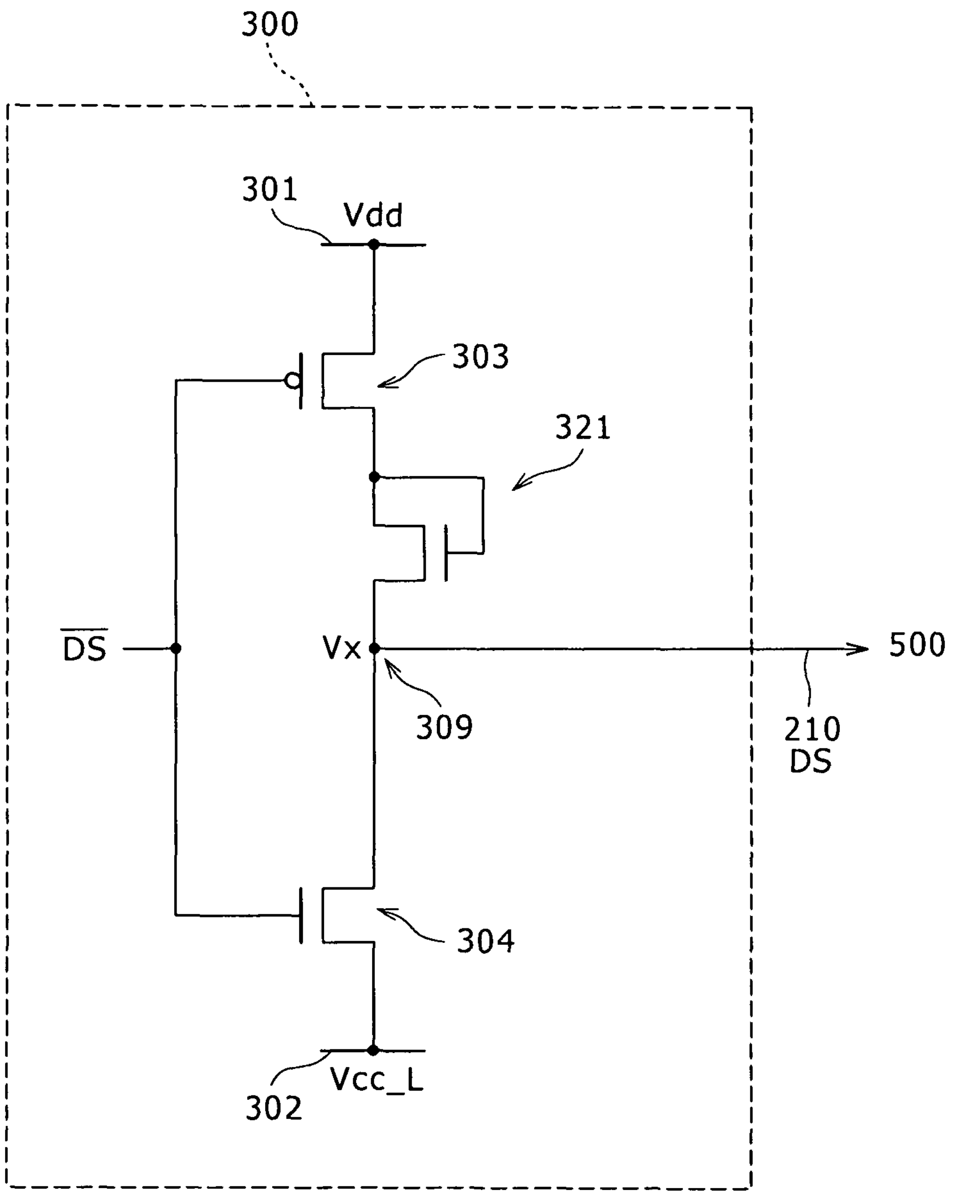
FIG. 9 is a circuit diagram showing a configuration of a first example of the output buffer according to the embodiment of the present invention.

FIG. 9 is a circuit diagram showing a configuration of a first example of the output buffer 300 according to the embodiment of the present invention. In this example, there is shown the configuration in which the output buffer 300 includes a field effect type n-channel transistor 321 as the potential compensating circuit 320. The n-channel transistor 321 has a diode connection form in which a gate terminal of the n-channel transistor 321 is connected to the drain terminal of the p-channel transistor 303. It is noted that since the configuration of the constituent elements of the output buffer 300 other than the n-channel transistor 321 is the same as that shown in FIG. 8, a description thereof is omitted here for the sake of simplicity.

Each of a drain terminal and the gate terminal of the n-channel transistor 321 is connected to the drain terminal of the p-channel transistor 303. In addition, each of the power source line 210 and the drain terminal of the n-channel transistor 304 is connected to a source terminal of the n-channel transistor 321.

In this case, when the drive current supplied from the p-channel transistor 303 is large, the voltage drop is large in the n-channel transistor 321 serving as the potential compensating circuit 320. As a result, a gate-to-source voltage of the n-channel transistor 321 becomes large, and thus an electrical resistance of the n-channel transistor 321 is reduced. On the other hand, when the drive current supplied from the p-channel transistor 303 is small, the gate-to-source voltage of the n-channel transistor 321 becomes small, and thus the electrical resistance of the n-channel transistor 321 becomes large. As a result, the n-channel transistor 321 changes the electrical resistance thereof in accordance with the magnitude of the drive current supplied from the p-channel transistor 303, thereby suppressing the change in potential at the output node 309.

Figure 10:
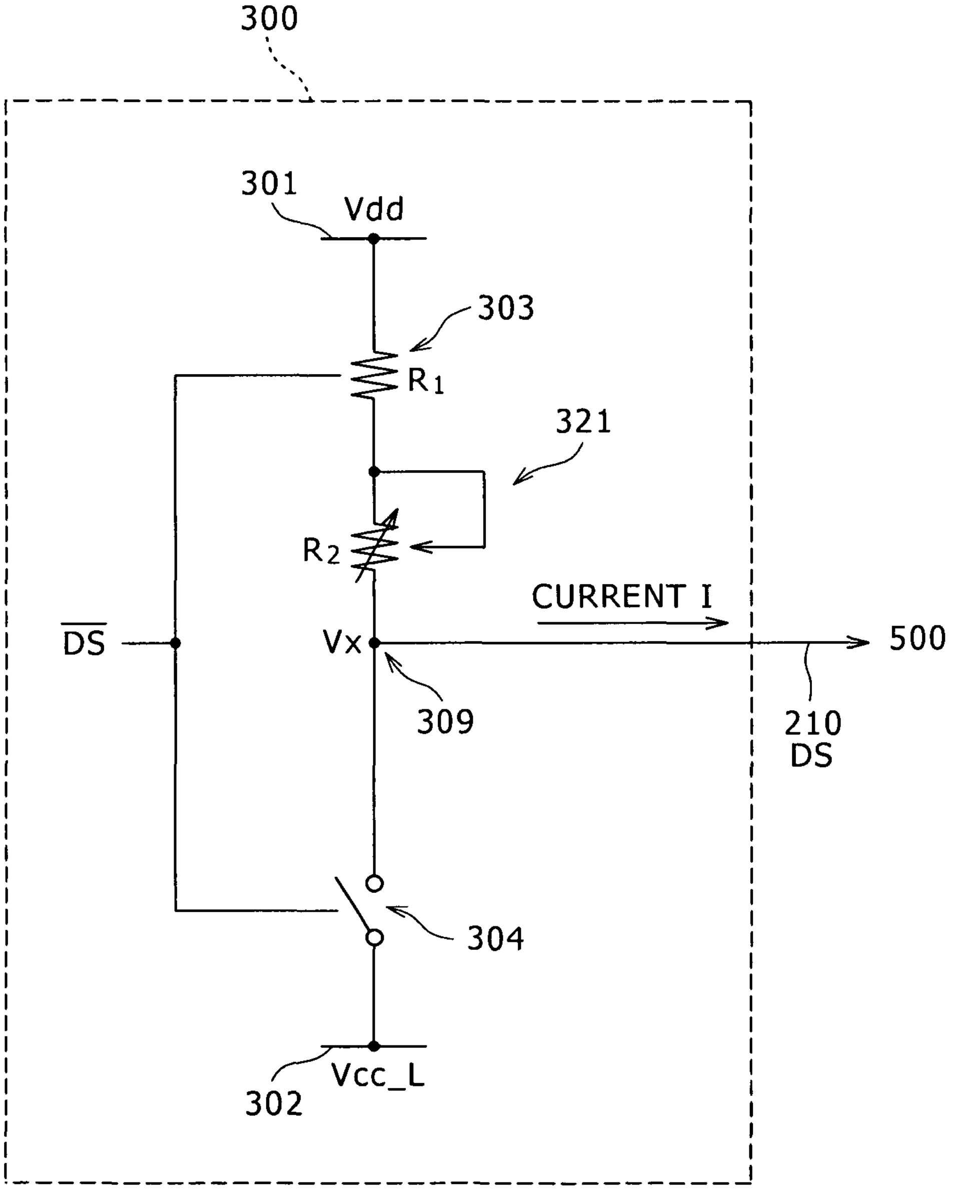
FIG. 10 is an equivalent circuit diagram of the configuration of the first example of the output buffer according to the embodiment of the present invention.

FIG. 10 is an equivalent circuit diagram showing the configuration of the first example of the output buffer 300 according to the embodiment of the present invention shown in FIG. 9. In this case, an operation of the output buffer 300 described above is explained by using mathematical expressions. In this case, it is supposed that in a state in which the potential Vss at the L level is inputted from the level shifter 223 to each of the gate terminals of the p-channel transistor 303 and the n-channel transistor 304, the total sum I of the drive current is supplied from the fixed power source line 301 to the light emitting elements 604 of the pixel circuits 600 through the respective power source lines DS 210. It is noted that in this case, the n-channel transistor 304 is illustrated in the form of a switch, and is in the OFF (non-conduction) state.

Firstly, the potential Vx at the output node 309 can be expressed by Expression (3) in accordance with the Ohm's law:

$$Vx = Vdd - I\cdot(R_1 + R_2) \quad (3)$$

where $R_1$ is the electrical resistance of the p-channel transistor 303, and $R_2$ is the electrical resistance of the n-channel transistor 321.

Here, the electrical resistance $R_1$ of the p-channel transistor 303, and the electrical resistance $R_2$ of the n-channel transistor 321 are respectively expressed by Expressions (4) and (5):

$$R_1 = 1/\{\beta_{bp}(Vdd - Vss - Vthbp)\} \quad (4)$$

$$R_2 = 1/\{\beta_n(Vdd - I\cdot R_1 - Vx - Vthn)\} \quad (5)$$

where $\beta_{bp}$ and $\beta_n$ are respectively constants representing the performances of the p-channel transistor 303 and the n-channel transistor 321, and Vthbp and Vthn are respectively threshold voltages of the p-channel transistor 303 and the n-channel transistor 321.

Also, the constant $\beta(\beta_{bp}, \beta_n)$ representing the performance of the p-channel or n-channel transistor is generally expressed by Expression (6):

$$\beta = (1/2)\cdot(W/L)\cdot Cox\cdot\mu \quad (6)$$

where W is a channel width, L is a channel length, Cox is a gate capacitance, and $\mu$ is a mobility.

Here, $R_2$ can be expressed by Expression (7) by substituting Expression (3) into Expression (5):

$$R_2=1/\{\beta_n(I\cdot R_2-Vthn)\}^2 \quad (7)$$

In addition, terms other than $R_2$ in Expression (7) are transposed to the left-hand side member, and Expression (7) is developed, thereby obtaining Expression (8):

$$\beta_n\cdot I\cdot R_2^2-\beta_n\cdot Vthn\cdot R_2-1=0 \quad (8)$$

Here, $R_2$ can be expressed by Expression (9) based on a formula for solutions:

$$R_2=\frac{\beta_n\cdot Vthn\pm\sqrt{(\beta_n\cdot Vthn)^2+4\beta_n\cdot I}}{2\beta_n\cdot I} \quad (9)$$

At this time, since $R_2$ is always positive, Expression (9) is expressed by Expression (10):

$$R_2=\frac{\beta_n\cdot Vthn+\sqrt{(\beta_n\cdot Vthn)^2+4\beta_n\cdot I}}{2\beta_n\cdot I} \quad (10)$$

Also, Expression (11) is obtained when Expression (10) is expressed by transforming Expression (10) into two terms:

$$R_2=\frac{Vthn}{2I}+\sqrt{\frac{(\beta_n\cdot Vthn)^2+4\beta_n\cdot I}{4\beta_n^2\cdot I^2}} \quad (11)$$

As previously stated, it is understood from Expression (11) that when the drive current I caused to flow from the fixed power source line 301 increases, the electrical resistance $R_2$ of the n-channel transistor 321 serving as the potential compensating circuit 320 decreases accordingly, while when the current I decreases, the electrical resistance $R_2$ of the n-channel transistor 321 increases accordingly.

In addition, as apparent from Expression (3), the n-channel transistor 321 operates so as to reduce the voltage drop of the potential Vx at the output node 309 by reducing the electrical resistance $R_2$ thereof against the increase in the drive current I. On the other hand, the n-channel transistor 321 operates so as to reduce the change in voltage drop of the potential Vx by increasing the electrical resistance $R_2$ thereof against the decrease in the drive current I.

As has been described, according to the first example of the output buffer 300 of the embodiment of the present invention, the provision of the n-channel transistor 321 results in that the electrical resistance $R_2$ of the n-channel transistor 321 changes so as to suppress the change width of the potential at the output node 309 in accordance with the magnitude of the drive current supplied to the corresponding pixel circuits 600. As a result, the luminance difference between each two light emitting elements for each row is reduced, thereby making it possible to reduce the cross talk.

Figure 11:
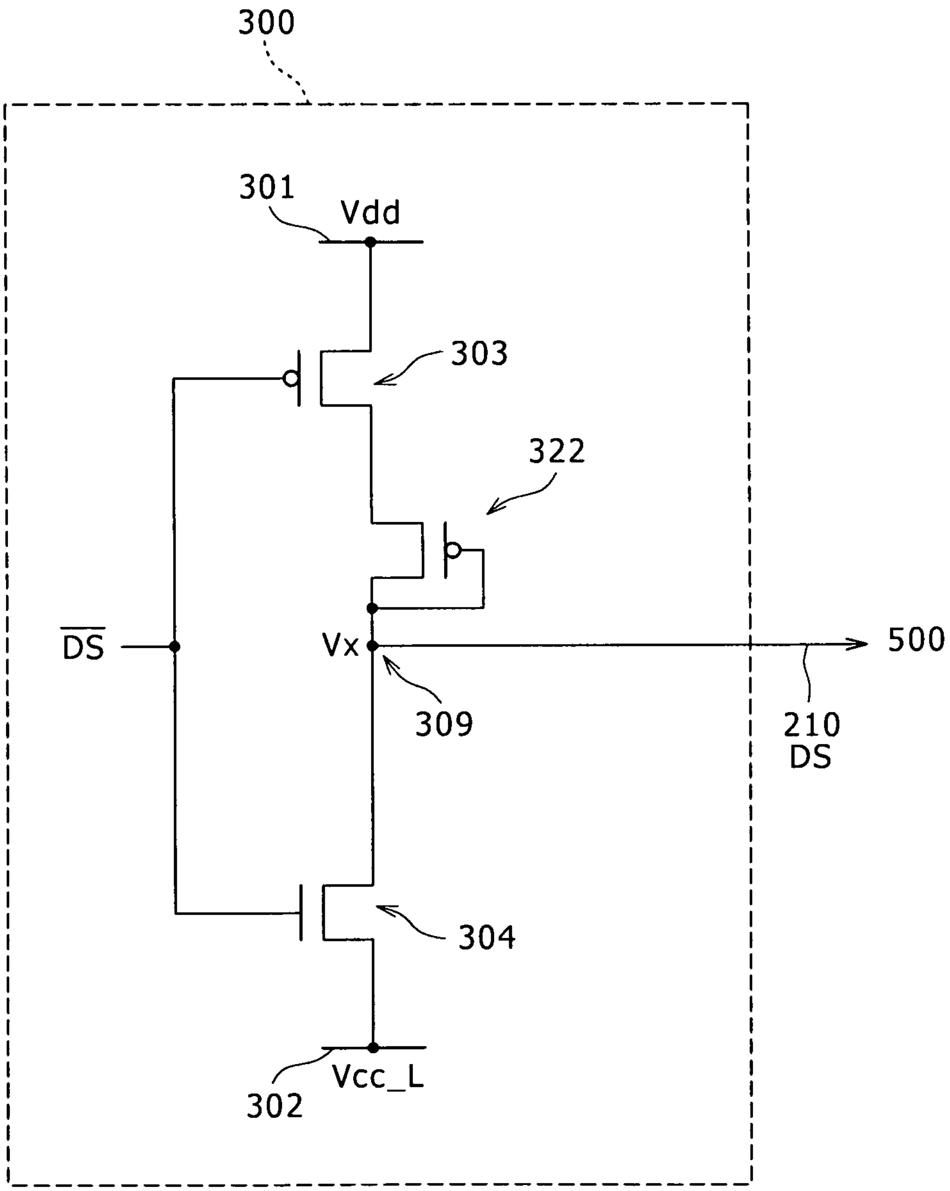
FIG. 11 is a circuit diagram showing a configuration of the second example of the output buffer according to a second example of the embodiment of the present invention.

FIG. 11 is a circuit diagram showing a configuration of a second example of an output buffer 300 according to the embodiment of the present invention. In the second example, there is shown the configuration when the output buffer 300 includes a field effect type p-channel transistor 322 as the potential compensating circuit 320 instead of including the n-channel transistor 321 in the first example. The p-channel transistor 322 has a diode connection form in which a source terminal of the p-channel transistor 322 is connected to the drain terminal of the p-channel transistor 303. It is noted that since the configuration of the constituent elements of the output buffer 300 other than the p-channel transistor 322 is the same as that shown in FIG. 8, a description thereof is omitted here for the sake of simplicity.

A source terminal of the p-channel transistor 322 serving as the potential compensating circuit 320 is connected to the drain terminal of the p-channel transistor 303. In addition, each of a gate terminal of the p-channel transistor 322, the power source line 210, and the drain terminal of the n-channel transistor 304 is connected to a drain terminal of the p-channel transistor 322.

In this case, when the drive current supplied from the p-channel transistor 303 is large, the voltage drop is large in the p-channel transistor 322 serving as the potential compensating circuit 320 accordingly. As a result, a gate-to-source voltage of the p-channel transistor 322 becomes large, and thus an electrical resistance of the p-channel transistor 322 is reduced. On the other hand, when the drive current supplied from the p-channel transistor 303 is small, the voltage drop in the p-channel transistor 322 becomes small accordingly. As a result, the gate-to-source voltage of the p-channel transistor 322 becomes small, and thus the electrical resistance of the p-channel transistor 322 becomes large. As a result, the p-channel transistor 322 changes the electrical resistance of the p-channel transistor 322 itself in accordance with the magnitude of the drive current supplied to the corresponding pixel circuits 600, thereby suppressing the change in potential at the output node 309.

Figure 12:
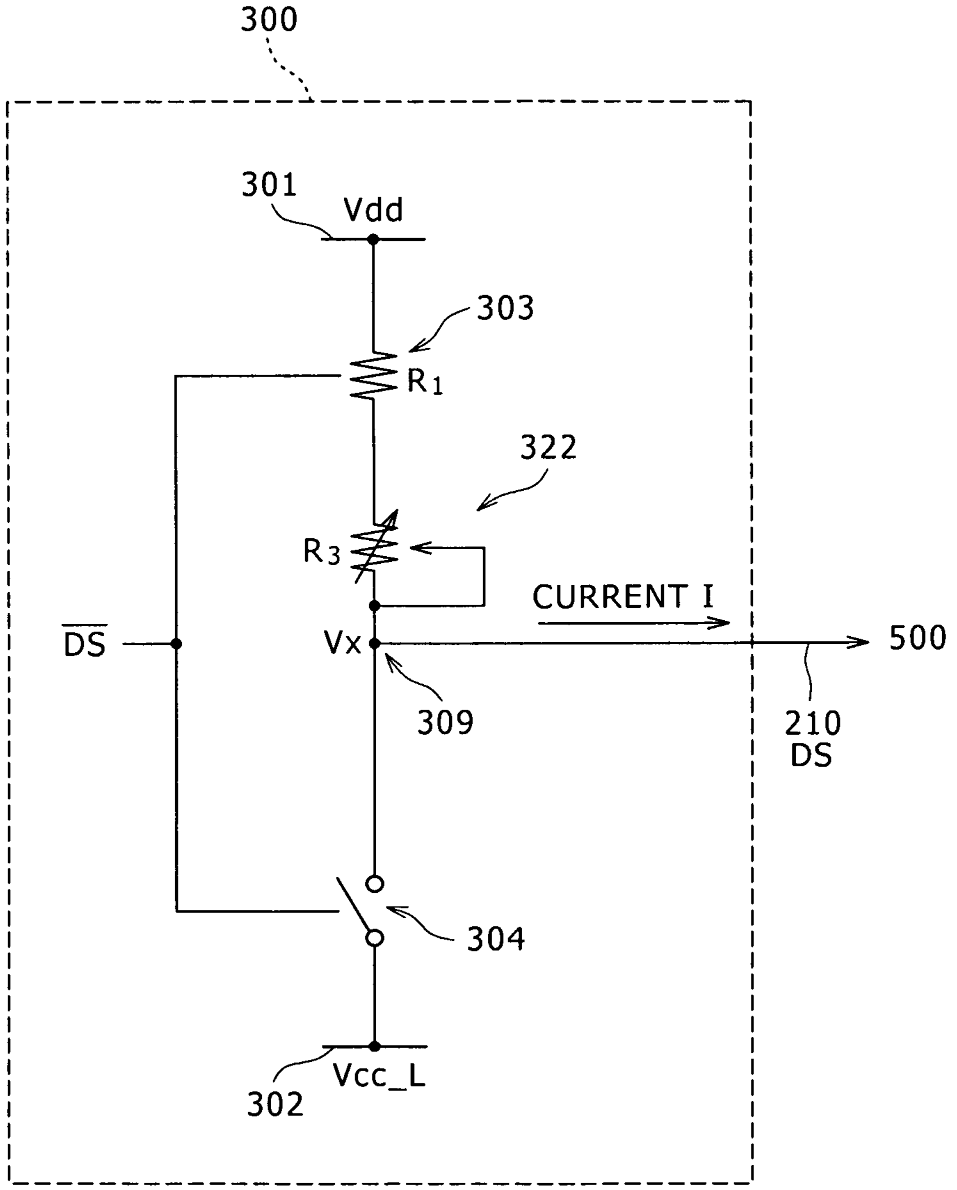
FIG. 12 is an equivalent circuit diagram of the configuration of the second example of the output buffer according to the embodiment of the present invention.
Figure 13A:
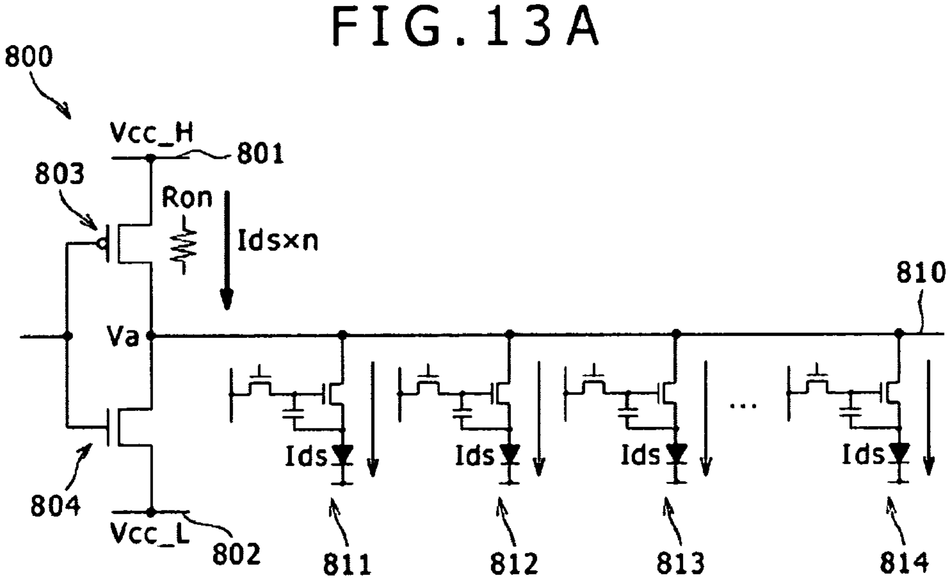
FIGS. 13A and 13B are conceptual circuit diagrams each exemplifying a flow of a drive current supplied from an output buffer for an emission time period.
Figure 13B:
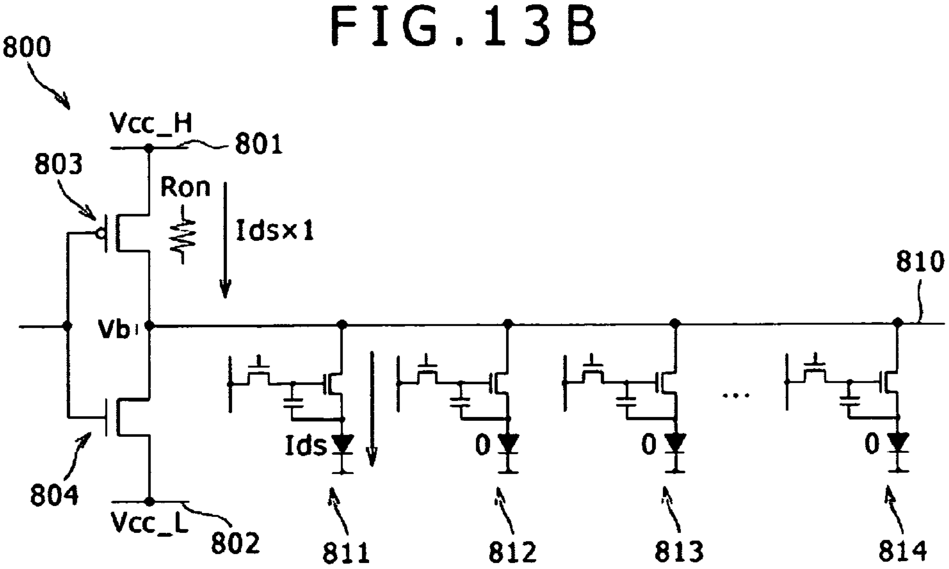
Figure 14:
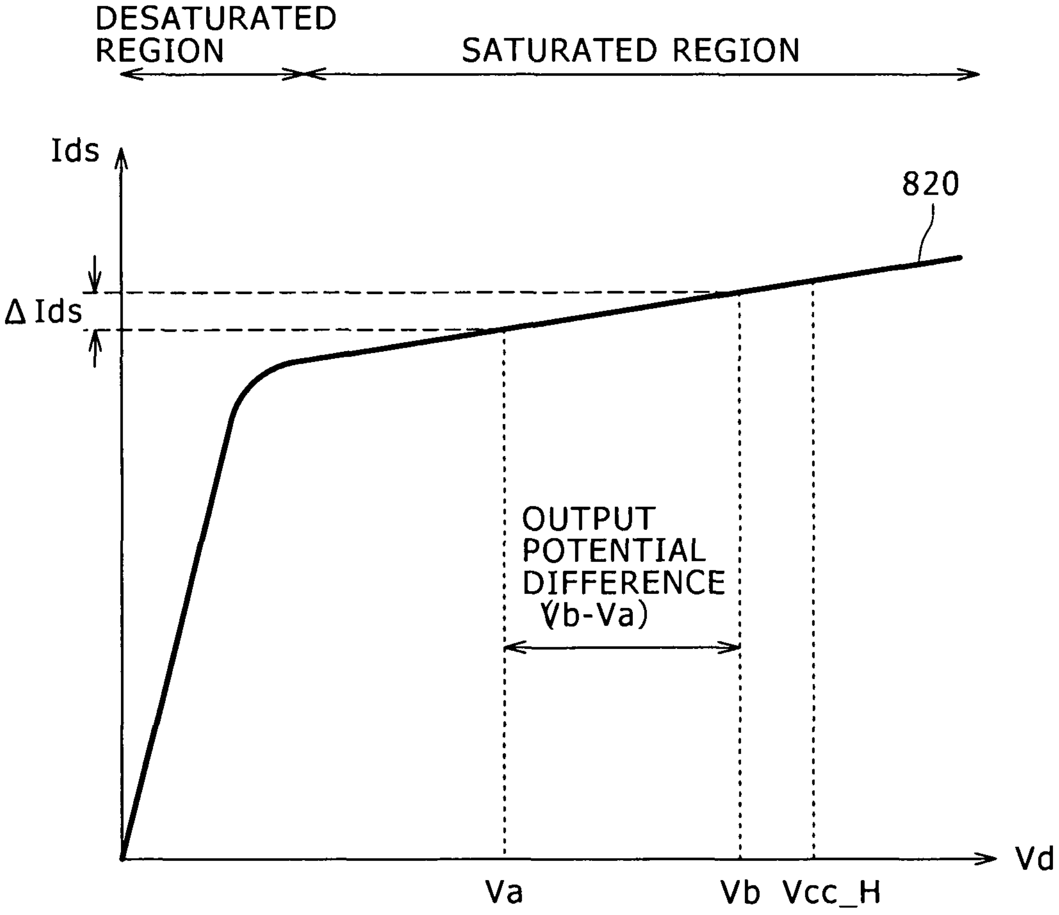
FIG. 14 is a graph schematically showing a relationship between a drain potential and a drive current of a drive transistor in a pixel circuit.
Figure 15A:
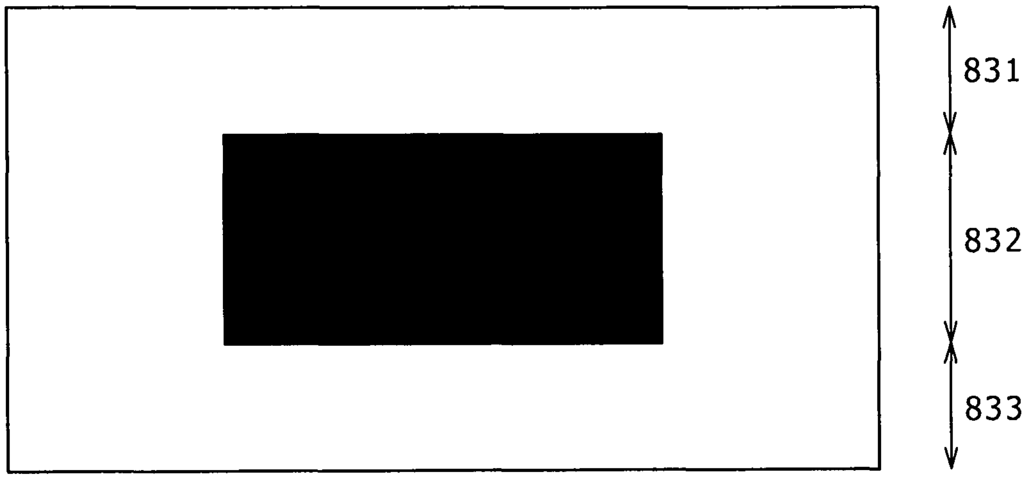
FIGS. 15A and 15B are conceptual diagrams exemplifying an influence of cross talk appearing owing to voltage drop in an output buffer.
Figure 15B:
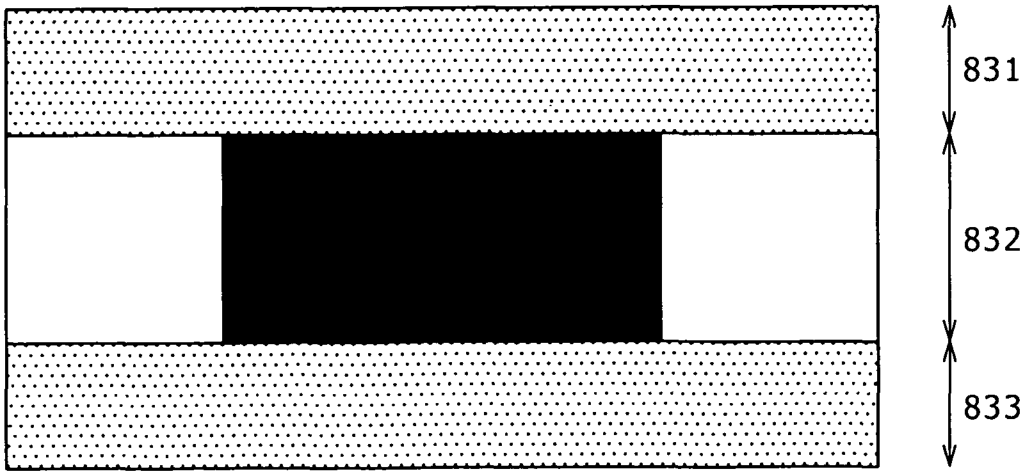

FIG. 12 is an equivalent circuit diagram showing the configuration of the second example of the output buffer 300 according to the embodiment of the present invention shown in FIG. 11. In this example, an electrical resistance $R_3$ of the p-channel transistor 322 in an ON state is shown instead of showing the electrical resistance $R_2$ of the n-channel transistor 321 in the ON (conduction) state in FIG. 10. In addition, it is suppressed that in a state in which the potential at the L level is inputted from the level shifter 223 to each of the gate terminals of the p-channel transistor 303 and the n-channel transistor 304, the total sum I of the drive current from the fixed power source line 301 is supplied to the light emitting elements 604 of the pixel circuits 600 through the respective power source lines DS 210. It is noted that since the configuration of the constituent elements of the output buffer 300 other than the electrical resistance $R_3$ of the p-channel transistor 322 in the ON state is the same as that shown in FIG. 10, a description thereof is omitted here for the sake of simplicity.

In this case as well, as previously stated with reference to FIG. 10, the potential Vx at the output node 309 can be expressed by Expression (12) in accordance with the Ohm's law:

$$Vx=Vdd-I\cdot(R_1+R_3) \quad (12)$$

Here, the electrical resistance $R_3$ of the p-channel transistor 322 is expressed by Expression (13):

$$R_3=1/\{\beta_p(Vdd-I\cdot R_1-Vx-Vthp)\} \quad (13)$$

where $\beta_p$ is a constant representing a performance of the p-channel transistor 322, and Vthp is a threshold voltage of the p-channel transistor 322.

Next, $R_3$ can be expressed by Expression (14) by substituting Expression (12) into Expression (13):

$$R_3=1/\{\beta_p(I\cdot R_3-Vthp)^3\} \quad (14)$$

Also, as stated with reference to FIG. 10, Expression (14) is developed and the formula for the resolutions is used, whereby $R_3$ is expressed by Expression (15):

$$R_3 = \frac{Vthp}{2I} + \sqrt{\frac{(\beta_p \cdot Vthp)^2 + 4\beta_p \cdot I}{4\beta_p^2 \cdot I^2}} \quad (15)$$

It is understood from Expression (15) that when the total sum I of the drive current caused to flow from the fixed power source line 301 increases, the electrical resistance $R_3$ of the p-channel transistor 322 serving as the potential compensating circuit 320 decreases accordingly, while when the total sum I of the current decreases, the electrical resistance $R_3$ of the p-channel transistor 322 increases accordingly.

In addition, as apparent from Expression (12), the p-channel transistor 322 operates so as to reduce the voltage drop of the potential Vx at the output node 309 by reducing the electrical resistance $R_3$ thereof against the increase in drive current I. On the other hand, the p-channel transistor 322 operates so as to reduce the change in voltage drop by increasing the electrical resistance $R_3$ thereof against the decrease in the drive current I.

As has been described, in the second example as well of the output buffer 300 according to the embodiment of the present invention, the change in potential at the output node 309 following the drive current I caused to flow from the fixed power source line 301 can be suppressed similarly to the case of FIG. 10. As a result, the luminance difference between each two light emitting elements for each row is reduced, thereby making it possible to reduce the cross talk.

As set forth hereinabove, according to the embodiment of the present invention, even when the voltage drop is caused by the drive current caused to flow through the output buffer 300 for the emission time period, the provision of the potential compensating circuit 320 results in that the width of the change in voltage drop is reduced, thereby making it possible to reduce the cross talk. In addition, the using of the field effect transistor as the potential compensating circuit 320 results in that the field effect transistor can be relatively simply mounted to the output buffer 300 while the scale-up of the circuit scale is suppressed.

It is noted that although the embodiments of the present invention have been exemplified for the purpose of realizing the present invention, and have the correspondence relationship with the specific features of the present invention in the appended claims, respectively, the present invention is by no means limited thereto. Therefore, various changes can be made without departing from the gist of the present invention.

The present application contains subject matter related to that disclosed in Japanese Priority Patent Application JP 2008-105581 filed in the Japan Patent Office on Apr. 15, 2008, the entire content of which is hereby incorporated by reference.

What is claimed is:

1. A display device, comprising:

a plurality of pixel circuits;

a power source line connected to corresponding ones of the plurality of pixel circuits; and an output buffer circuit including:

a first power source supply terminal connected through a first current path to the power source line such that a first potential appearing on the first power source supply terminal may be selectively applied as a corresponding output potential to the power source line;

a second power source supply terminal connected through a second current path to the power source line such that a second potential appearing on the second power source supply terminal may be selectively applied as a corresponding output potential to the power source line; and a variable resistance circuit interposed in the first current path between the first power source supply terminal and the power source line, wherein:

the output buffer circuit is configured to supply currents to the corresponding ones of the plurality of pixel circuits by applying a selected corresponding output potential corresponding to either the first potential or the second potential to the power source line;

the variable resistance circuit is configured such that a resistance value thereof changes smoothly based on a magnitude of a total sum of the currents supplied to the corresponding ones of the plurality of pixel circuits; and the variable resistance circuit suppresses a change in the selected corresponding output potential when the magnitude of the total sum of the currents supplied to the corresponding ones of the plurality of pixel circuits changes.

2. The display device according to claim 1, wherein the variable resistance circuit comprises a field effect transistor with the gate electrode thereof directly connected to the drain electrode thereof.

3. The display device according to claim 1, wherein each of the plurality of pixel circuits comprises a light emitting element which emits a light in accordance with the current supplied thereto from the power source line.

4. The display device according to claim 3, further comprising:

a data line connected to corresponding ones of the plurality of pixel circuits;

a scanning line connected to the corresponding ones of the plurality of pixel circuits;

a data driving circuit for alternately supplying a video signal and a reference signal as a data signal to the date line; and a scanning driving circuit for supplying a control signal to the scanning line, wherein each of the plurality of pixel circuits further comprises first and second transistors, and a hold capacitor, the first transistor causes the hold capacitor to hold therein a potential of the data signal from the data line in accordance with the control signal from the scanning line, when the first or second potential applied from the power source line is supplied thereto, the second transistor supplies a drive current to the light emitting element in accordance with the potential of the data signal held in the hold capacitor, and the light emitting element emits a light in accordance with the drive current.

* * * * *